US012223975B2

(12) United States Patent
Lee et al.

(10) Patent No.: US 12,223,975 B2
(45) Date of Patent: Feb. 11, 2025

(54) METHOD TO REMOVE TALKER INTERFERENCE TO NOISE ESTIMATOR

(71) Applicant: Google LLC, Mountain View, CA (US)

(72) Inventors: Jae Lee, Palo Alto, CA (US); Priya Kasirajan, Los Gatos, CA (US); Leng Ooi, San Jose, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 17/633,782

(22) PCT Filed: Sep. 15, 2020

(86) PCT No.: PCT/US2020/050869
§ 371 (c)(1),
(2) Date: Feb. 8, 2022

(87) PCT Pub. No.: WO2021/067027
PCT Pub. Date: Apr. 8, 2021

(65) Prior Publication Data

US 2022/0328057 A1 Oct. 13, 2022

Related U.S. Application Data

(60) Provisional application No. 62/908,829, filed on Oct. 1, 2019.

(51) Int. Cl.

| | |
|---|---|
| ***G10L 21/0232*** | (2013.01) |
| ***G10L 21/0208*** | (2013.01) |
| ***G10L 21/0216*** | (2013.01) |

(52) U.S. Cl.
CPC ............................... *G10L 21/0232* (2013.01); *G10L 2021/02087* (2013.01); *G10L 2021/02165* (2013.01); *G10L 2021/02166* (2013.01)

(58) Field of Classification Search
CPC ....... G10L 21/0232; G10L 2021/02087; G10L 2021/02165; G10L 2021/02166;
(Continued)

(56) References Cited

U.S. PATENT DOCUMENTS 4,888,807 A * 12/1989 Reichel .................. H04R 3/005
381/113
10,887,685 B1 * 1/2021 Harmke ................... H04R 1/04
(Continued)

FOREIGN PATENT DOCUMENTS

CN 104376848 A 2/2015
CN 105516846 A 4/2016

OTHER PUBLICATIONS

"International Search Report and Written Opinion", Application No. PCT/US2020/050869, Nov. 12, 2020, 9 pages.
(Continued)

*Primary Examiner* — Pierre Louis Desir
*Assistant Examiner* — Fouzia Hye Solaiman
(74) *Attorney, Agent, or Firm* — Colby Nipper PLLC

(57) ABSTRACT

The present disclosure provides systems and method for determining a background noise level. The device may receive audio from two or more microphones. The audio may include a first signal and a second signal, such that each microphone receives its own signal. The time, loudness, frequency of the first and second signals may be compared to determine the source of the audio, such as whether the audio is the user's voice or background noise. Based on the source of the audio, the audio may be suppressed to reduce false estimations when calculating the background noise level.

21 Claims, 6 Drawing Sheets

(58) Field of Classification Search
CPC ... G10L 25/78; G10L 21/0216; H04R 1/1083; H04R 1/1016; H04R 1/406; G10K 11/17873
USPC .......................................................... 704/226
See application file for complete search history.

(56) References Cited

U.S. PATENT DOCUMENTS

| | | | | |
|---|---|---|---|---|
| 2017/0263267 | A1* | 9/2017 | Dusan | H04R 1/1083 |
| 2018/0286433 | A1* | 10/2018 | Hicks | G10L 21/0232 |
| 2019/0189144 | A1* | 6/2019 | Dusan | H04R 3/005 |
| 2021/0044896 | A1* | 2/2021 | Kim | G10L 21/0356 |

OTHER PUBLICATIONS

International Preliminary Report on Patentability for International Application No. PCT/US2020/050869 dated Apr. 14, 2022. 8 pages.
International Search Report and Written Opinion for International Application No. PCT/US2020/050869 dated Nov. 12, 2020. 3 pages.
"Foreign Office Action", EP Application No. 20781218.1, May 6, 2024, 6 pages.
"Foreign Office Action", CN Application No. 202080048346.2, Sep. 13, 2024, 21 pages.

* cited by examiner

METHOD TO REMOVE TALKER INTERFERENCE TO NOISE ESTIMATOR

CROSS-REFERENCE TO RELATED APPLICATIONS

The present application is a national phase entry under 35 U.S.C. § 371 of International Application No.: PCT/US2020/050869, filed Sep. 15, 2020, which claims priority from U.S. Provisional Patent Application No. 62,908,829, filed Oct. 1, 2019, all of which are incorporated herein by reference.

BACKGROUND

Some electronic devices, such as some wearable electronic devices, may detect a background noise level. For example, the detected background noise level may be used for noise cancellation, to adjust a playback volume for audio output, etc. To determine the background noise level, the electronic devices may monitor the audio received by a microphone. However, the microphone may pick up all noise, including noise that is not background noise. For example, the microphone may falsely detect a user's speech input as noise, and thus may provide for false estimations when calculating the background noise level.

BRIEF SUMMARY

One aspect of the disclosure provides a method for determining a background noise level. The method includes receiving, by one or more processors, audio from a first microphone and a second microphone. The method includes comparing, by the one or more processors, a first time the audio is received at the first microphone and a second time the audio is received at the second microphone, determining, based on the comparison whether the received audio is a user voice or background noise, a source of the audio, and suppressing, using the one or more processors based on the source of the audio, audio received from a first source. The method may further include determining, using one or more sensors, whether a user is talking.

When the user is talking, the method includes suppressing, using the one or more processors, the audio from the first microphone such as to create an effect of receiving the audio through a microphone that is beamformed in a direction away from the user's mouth. The method may further include detecting, by the one or more processors, the user's speech in the suppressed audio and nullifying, using the one or more processors, the user's speech from the suppressed audio.

Another aspect of the disclosure provides for a device having two or more microphones and one or more processors in communication with the two or more microphones. The one or more processors may be configured to receive audio from a first microphone and a second microphone. The one or more processors may be further configured to compare a first time the audio is received at the first microphone and a second time the audio is received at the second microphone, determine a source of the audio, and suppress audio received from a first source.

In some instances, the one or more processors in communication with the two or more microphones are further configured to determine whether a user is talking. When the user is talking, the one or more processors may be configured to suppress at the audio in a direction away from the user's mouth. The one or more processors may be further configured to determine the user's speech, detect the user's speech in the suppressed signal, and nullify the user's speech from the suppressed signal.

Yet another aspect of the disclosure provides for a non-transitory computer-readable medium storing instructions, which when executed by one or more processors, cause the one or more processors to receive audio from a first microphone and a second microphone, compare a first time the audio is received at the first microphone and a second time the audio is received at the second microphone, determine a source of the audio, and suppress audio received from a first source based on the location of the source of the audio.

DETAILED DESCRIPTION

The systems and methods described herein relate to a device configured to determine a background noise level after removing speech interference. The device may include two omnidirectional microphones that receive audio. The device may compare the audio received through the first microphone with the audio received through the second. For example, the device may compare a time at which the audio was received at the first microphone with a time it was received at the second microphone, a volume of the audio received through the first and second microphones, frequencies received through the first and second microphones, etc. Based on such comparison, the device may determine a source of the audio. For example, the device may determine whether the audio is a user talking or if the audio is background noise. According to some examples, the determination of the source of the audio may further be determined based on sensor information, such as an accelerometer that detects when the user's mouth is moving in a way consistent with the user talking. Based on the source of the audio, and whether the user is talking, the audio may be processed using Digital Signal Processing ("DSP").

For example, if the user is talking, the audio may be processed to suppress the user's speech from the audio. In this regard, the processed audio has the effect of being received through a beamformed microphone, aimed in a direction of the background noise instead of a direction of the user's speech, though the audio was actually received through two or more omnidirectional microphones. In some examples, the user's speech may be canceled completely from the received audio, such as by using a cancellation technique. Accordingly, the user's speech does not contribute to a false estimation of the background noise level.

Figure 1B:
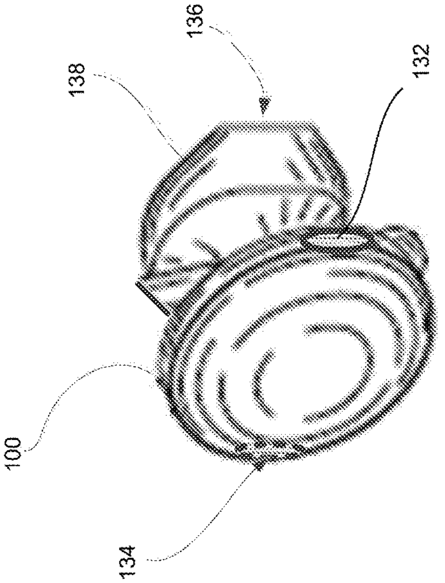
FIGS. 1A-B are perspective drawings of example devices according to aspects of the disclosure.
Figure 1A:
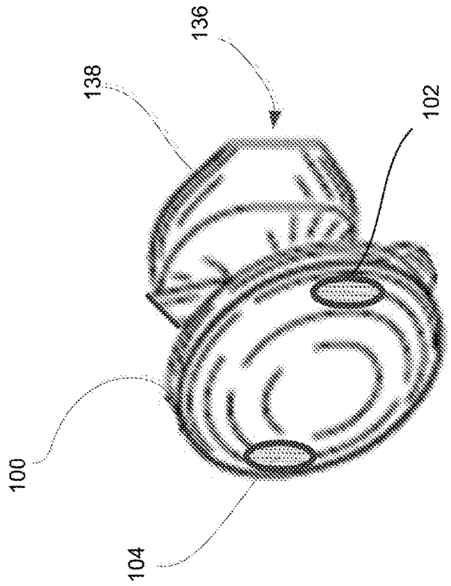

FIG. 1A illustrates an example device 100. While in this example the device 100 is an earbud, it should be understood that in other examples the device may be any of a variety of different types. For example, the device may be a headset, smartglasses, virtual reality player, other head-mounted display, etc. The device 100 may include input, sensors, internal electronics, and audio output.

The input may include an audio detection input, such as a first microphone 102 and a second microphone 104, for receiving audio input signals. As shown in FIG. 1A, the first microphone 102 may be located on one portion of the device, such as near the front of device 100. The second microphone 104 may be located in a second portion of the device, such as near the rear of the device 104. When the device 100 is an earbud, the front of the device may be, for example, near the mouth of the user when the earbud is within the ear. Each of the first and second microphones 102, 104 may have an omnidirectional beam pattern such that both the first and second microphones 102, 104 pick up sound around the user from various directions. For example, such detected sound may include speech of the user if the user is talking, and background noise. The first and second microphones may have overlapping range, and therefore may receive audio from a same source. However, because the first and second microphones have different positions on the device, audio signals received by the first microphone will differ from those received by the second microphone, despite that the audio signals are from the same source. For example, the time at which the signal is received by the respective microphones, the loudness in dB of the signals received by the respective microphones, and the frequency of the signals received by the respective microphones, amongst other factors, may be different.

According to some examples, the input may further include a separate user input, such as a touch-sensitive housing, dial, button, or other control for receiving a manual command.

Other types of user input, such as motion sensors or other types of sensors, may be adapted to receive gesture input or the like.

As shown in FIG. 1B, the first microphone 132 may be located on a first edge of the device 100, such as a front edge of the device 100 that is closer to a user's face or mouth when the device is worn. The second microphone 134 may be located on a second edge of the device 100, such as the back edge that is further from the user's face or mouth, as compared to the front edge, when the device is worn.

While only two microphones are shown in FIGS. 1A and 1B, the device 100 may include more than two microphones. By way of example only, additional microphones may be positioned between the first and second microphones near a center of an outer surface of the device, near an upper and/or lower edge of the device, adjacent the first and second microphones, etc. Further, positions of the two or more microphones may differ from those shown in FIGS. 1A and 1B. For example, placement of the two or more microphones relative to a housing of the device may differ. For example, the two or more microphones may be located on any portion or any surface of the device. Additionally or alternatively, placement of the two or more microphones relative to one another may differ, such as by increasing or decreasing a distance between the microphones.

The sensors may determine whether a user is talking. For example, the sensors may include an accelerometer that detects movement consistent with the user talking. The movement may include movement of the mouth or jaw of the user. According to other examples, the sensors may determine whether the device is being worn by a user. For example, the sensors may include touch sensors, heat sensors, motion, sensors, or the like that detect conditions consistent with the device being inserted into a user's ear, worn on the head, or otherwise worn depending on a type of the device.

The internal electronics may include, for example, one or more processors or other components adapted to process the audio received through the two or more microphones 102, 104. Such processing may result in audio signals having an effect as if they were received through a beamformed microphone. For example, the internal electronics may determine a source of a particular audio signal, and process the received audio to reduce or remove audio signals from the determined source. For example, the internal electronics may determine whether the received audio is a user talking or if the audio is background noise. The internal electronics may determine the source by, for example, comparing audio received through the first and second microphones 102, 104. Such comparisons may relate to the audio's loudness in decibels ("dB"), the time at which the audio was received at each microphone, the frequency, etc.

By comparing the loudness of the signal received, the device may determine whether the location of the source of the audio is near the front of the user or coming from behind the user. For example, if the first signal received by the first microphone is louder than the second signal received by the second microphone, the location of the source of the sound may be closer to the first microphone. Additionally or alternatively, sound may be coming from towards a front of the user such that the first microphone receives a louder signal than the second signal received by the second microphone. Therefore, the first microphone receiving a louder signal than the second signal may indicate that the audio is the user's speech. In some examples, if the second signal received by the second microphone is louder than the first signal received by the first microphone, the location of the source of the sound may be closer to the second microphone. The sound may be coming from behind the user and, therefore, may be background noise. The examples provided herein are based on the first microphone being closest to the user's mouth and is not meant to be limiting with how respect to the placement of the microphones, the determination regarding location, or the type of audio received by the microphones.

By comparing the time at which the signal were received by each microphone, the device may determine whether the location of the source of the audio is near the front of the user or coming from behind the user. In some examples, if the first microphone receives the first signal before the second microphone receives the second signal, the location of the source of the sound may be closer to the first microphone. Additionally or alternatively, sound may be coming from the front of the user such that the first microphone receives the first signal before the second microphone receives the second signal. The first microphone receiving the first signal before the second microphone receives the second signal may indicate that the audio is the user's speech. When the second microphone receives the second signal before the first microphone receives the first signal, the location of the source of the audio may be closer to the second microphone or behind the user. Thus, the source of the audio may be background noise.

The internal electronic may suppress the signal received from at least one of the microphones 102, 104 in order to calculate the background noise level. For example, if the user is talking, the internal electronics may suppress the signal from the first microphone to remove the user's speech from the background noise calculation.

According to some examples, the internal electronics may additionally perform other types of signal processing simultaneously with suppressing the user's speech for background noise estimation. For example, the internal electronics may suppress the signal received from at least one of the microphones 102, 104 for noise cancellation purposes. In such an example, the internal electronics may suppress the background noise in order to amplify the user's speech for transmission purposes.

The output 136 may include one or more speakers for outputting audio, such as playback of music, speech, or other audio content. The output 136 may be located on a portion 138 of the device 100 that is inserted into the ear, such as the ear insert of the ear bud.

While the description and examples herein refer to the device 100 as an earbud, it should be understood that in other examples the device may be an augmented reality and/or virtual reality headset, Bluetooth enabled headset, smart glasses, head-mountable display, smart watch, mobile phone and/or smart phone, tablets, music players, etc.

Figure 1C:
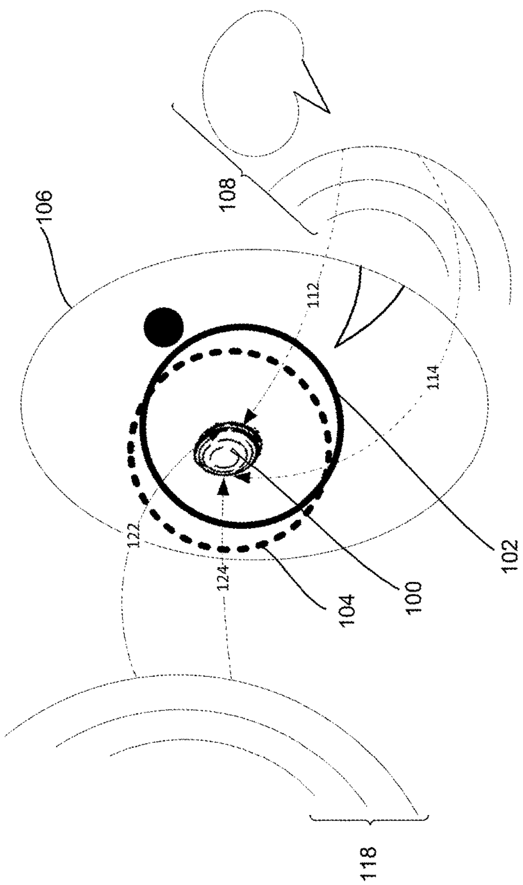
FIG. 1C is a pictorial diagram of a user wearing a device according to FIGS. 1A-B.

FIG. 1C illustrates a user wearing the device. The device 100 may have a first microphone, shown by omnidirectional beam pattern 102, and a second microphone, shown by omnidirectional beam pattern 104. The first and second microphones 102, 104 may receive audio that is the user's speech 108 and background noise 118. The device 100 may determine that the audio is the user's speech 108 based on sensor information. For example, an accelerometer may detect that the user's mouth is moving in a way consistent with the user 106 talking. If the user is talking, the first microphone 102 may receive 112 the user's speech 108 before the second microphone 104 receives 114 the user's speech 108. Additionally or alternatively, the first microphones 104 may receive 112 user's speech 108 louder than the second microphone 104 receives 114 user's speech. The frequency of the audio signals received at the first microphone 102 and second microphone 104 may be compared to accelerometer readings to determine whether the source of the signal is correlated with the user's speech 108. The second microphone 104 may receive 124 background noise 118 before the first microphone 102 receives 122 the background noise 118. Additionally or alternatively, the second microphone 104 may receive 124 background noise 118 louder than the first microphone 102 receives 122 the background noise 118. The device 100 may compare the time the audio and/or the loudness at which the audio was received by the first and second microphones 102, 104 to determine whether to suppress or amplify the signals.

Figure 2:
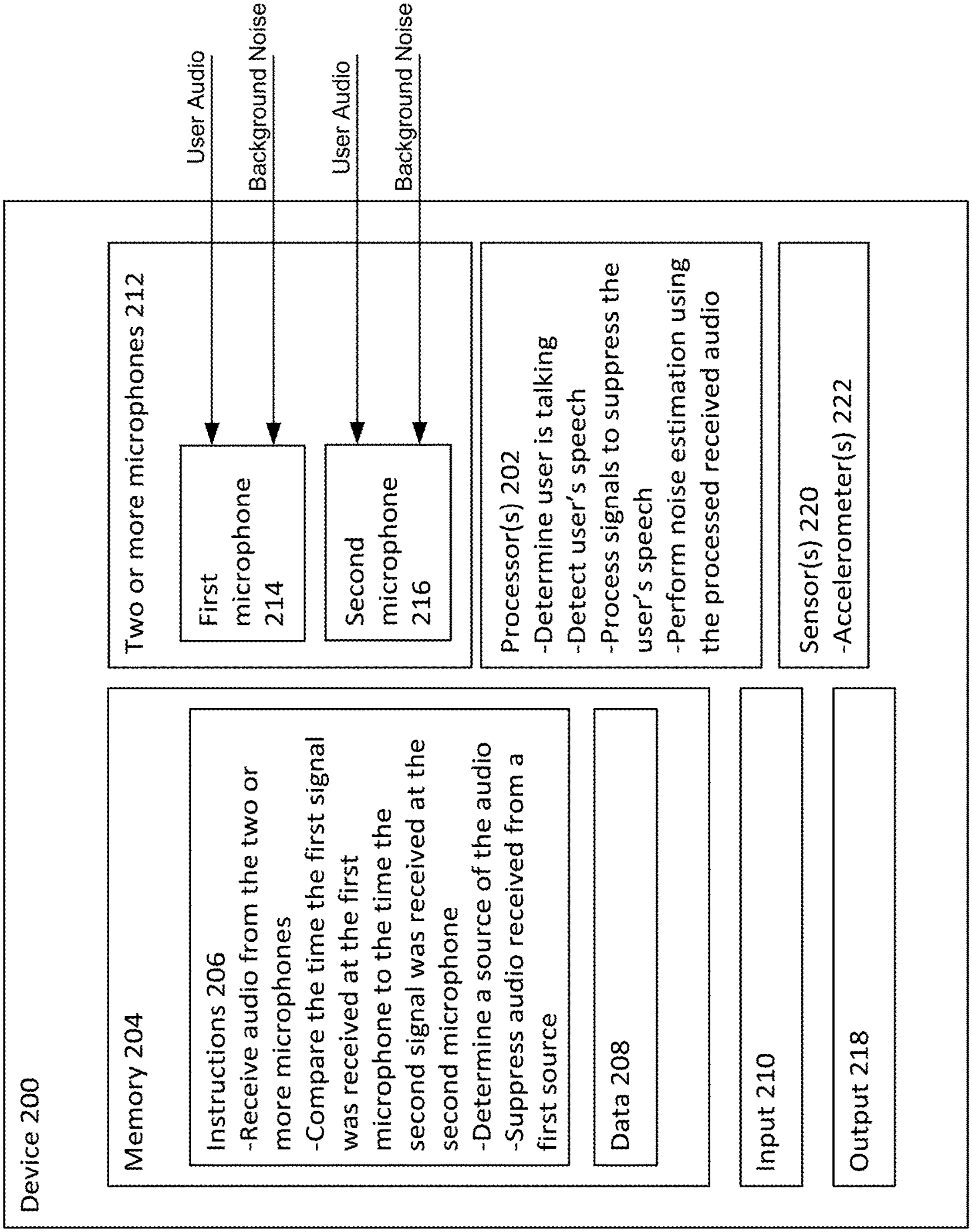
FIG. 2 is a block diagram illustrating an example device according to aspects of the disclosure.

FIG. 2 provides an example block diagram illustrating components of the device 200. As shown, the device 200 includes various components, such as one or more processors 202, memory 204, and other components typically present in microprocessors, general purpose computers, or the like. Device 200 also includes input 210, at least two microphones 212 including a first microphone 214 and a second microphone 216, an output 218, and sensors 218.

The one or more processors 202 may be any conventional processors, such as commercially available microprocessors. Alternatively, the one or more processors may be a dedicated device such as an application specific integrated circuit (ASIC) or other hardware-based processor. Although FIG. 2 functionally illustrates the processor, memory, and other elements of device 200 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 200. Accordingly, references to a processor or computing device will be understood to include references to a collection of processors or computing devices or memories that may or may not operate in parallel. The one or more processors 202 may be configured to perform DSP on the audio signals received by the two or more microphones 212.

Memory 204 may store information that is accessible by the processors 202, including instructions 206 that may be executed by the processors 202, and data 208. The memory 204 may be of a type of memory operative to store information accessible by the processors 202, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 206 and data 208 are stored on different types of media.

Data 208 may be retrieved, stored or modified by processors 202 in accordance with the instructions 206. For instance, although the present disclosure is not limited by a particular data structure, the data 208 may be stored in computer registers, in a relational database as a table having a plurality of different fields and records, XML documents, or flat files. The data 208 may also be formatted in a computer-readable format such as, but not limited to, binary values, ASCII or Unicode. By further way of example only, the data 208 may be stored as bitmaps comprised of pixels that are stored in compressed or uncompressed, or various image formats (e.g., JPEG), vector-based formats (e.g., SVG) or computer instructions for drawing graphics. Moreover, the data 208 may comprise information sufficient to identify the relevant information, such as numbers, descriptive text, proprietary codes, pointers, references to data stored in other memories (including other network locations) or information that is used by a function to calculate the relevant data.

The instructions 206 can be any set of instructions to be executed directly, such as machine code, or indirectly, such as scripts, by the processor 202. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The device 200 may further include an input 210 for receiving volume adjustment commands. The input 210 may be, for example, a touch sensor, dial, button, or other control for receiving a manual command. The device 200 may also include an output 218. The output 218 may be, for example, a speaker.

Device 200 may have at least two microphones 212 located in a variety of locations. A first microphone 214 may be located at a first location adjacent to a first edge of the device. The first microphone 212 may receive user audio, such as the user's speech and background noise. A second microphone 216 may be located at a second location adjacent to a second edge of the device. The second microphone

216 may receive user audio and background noise. The first microphone 214 and second microphone 216 may be located opposite each other.

Device 200 may include sensors 220 for determining whether a user is talking. The sensors 220 may include one or more of the at least two microphones 212. As described herein, the two or more microphones 212 may determine whether the audio signals received are the user's speech or background noise based on when the signals are received, the loudness at which the signals are received, the frequency at which the signals are received, etc. Additionally or alternatively, the sensors 220 may include an accelerometer 222. The accelerometer 222 may detect movement consistent with a user talking, such as movement of the user's mouth, jaw, and other parts of their body. The accelerometer 222 may also detect other types of movements that may be distinguished from the user talking. For example, while the accelerometer 222 may detect movements consistent with the user walking, typing, driving, etc., such movements can be distinguished from the talking movements and may be ignored. An accelerometer signal may be received by the device from the accelerometer 222. The received accelerometer signal is compared to a threshold, wherein the threshold indicates user activity consistent with talking. For example, motion may have a slower frequency response as compared to talking. While a person running may translate to approximately 3 Hz of frequency, a person talking may translate to approximately 100 Hz or more. Accordingly, a low pass filter may be placed at, for example, sub 10s of Hz or lower. The device determines whether the received accelerometer signal meets the threshold. If not, the device may continue to monitor accelerometer signals to determine whether the user is talking.

The accelerometer signal may in some examples include multiple signals from a plurality of accelerometers 222 inside one device or inside different coupled devices. For example, each of the plurality of accelerometers 222 may have a different sensitivity, or may be adapted to detect different types of user activity. Further, each of the plurality of accelerometers 222 may be positioned in a different way to optimize detection of the different types of user activity.

It should be understood that the device 200 may include other components which are not shown, such as a battery, charging input for the battery, signals processing components, etc. Such components may also be utilized in execution of the instructions 206.

Figure 3A:
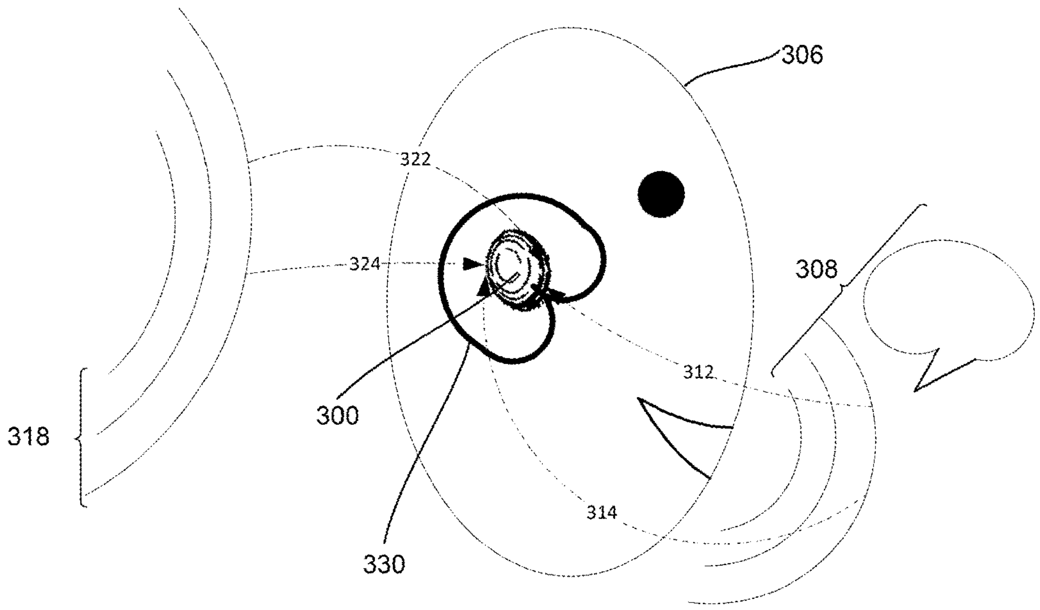
FIG. 3A-3D illustrate example beamforming effects of signal processing in different scenarios according to aspects of the disclosure.

FIG. 3A illustrates an example where the user is talking while using the device and the device has suppressed the user's speech. The device 300, as shown, may be an ear bud, much like the device described in FIGS. 1A-1C. The device 300 may include two or more microphones may receive audio. The audio may be the user talking 308 and background noise 318. Each microphone may have an omnidirectional beam pattern such that both the first and second microphones receive the user's speech 308 and background noise 318. The first microphone may receive 312 the user's speech 308 and it may also receive 322 background noise 318. The second microphone may receive 314 the user's speech 308 and it may also receive 324 background noise 318.

The device 300, using the sensors (not shown) may determine the source of the sound. For example, the sensors, including the first and second microphones and at least one accelerometer, may determine that the user 306 is talking 308. The first microphone may receive 312 the user's speech 308 before the second microphone receives 314 the user's speech 308. Additionally or alternatively, the first microphone may receive 312 the user's speech 308 louder than the second microphone receives 314 the user's speech 308. The device 300 may also determine that the user 306 is talking 308 when the accelerometer detects movement consistent with the user 306 talking. Thus, the source of the sound may be the user 306. Additionally or alternatively, the first and second microphones may also receive 322, 324 background noise 318 such that the background noise is the source of the sound.

After the device determines that the user is talking, the device may determine which source of audio to suppress. The device 300 may suppress the user's speech 308 or the background noise 318. The device 300 may suppress the user's speech 308 prior to calculating the background noise level to prevent false estimations. The device 300 may suppress the background noise 318 and, therefore, focus on the user's speech 308 such that device may transmit clearer audio signal to the person at the receiving end of the conversation. Additionally or alternative, the device may suppress the background noise to provide clearer audio output to the user. The same signals may be processed using DSP multiple times simultaneously such that the device may process the signals to both focus on the user's talking for a first application and to suppress the user's talking for a second application. For example, the same signal may be processed simultaneously to allow the device to clearly transmit the user's speech 308 and to remove the user's speech 308 for purposes of calculating the background noise.

As shown in FIG. 3A, the device may suppress the user's speech 308. To suppress the user's speech 308, the device 300 may perform DSP to suppress the audio from the source, i.e. the user's mouth, and, instead, focus on the background noise. The device 300 may process the audio received 312, 314, 322, 324 by the first and second microphones to result in a beam pattern as if the first and second microphones were beamformed when receiving 312, 314, 322, 324 the signals, shown by beam pattern 330. The signals received 312, 314, 322, 324 by the first and second microphones may have been processed into a cardioid beam pattern 330 pointing away from the user's 302 mouth to remove or suppress the user's 306 speech 308 from the audio detected by the first and second microphones. A cardioid beam pattern focuses on sound coming from one direction more than another. The processed signal 330 may focus on audio coming from behind the user, i.e. the background noise 318, instead of on the user's speech 308.

Device 306 may calculate the background noise level once the user's speech 308 is suppressed such that the user's speech 308 does not provide a false estimation of the background noise level. The device may adjust the playback volume of the device based on the calculated background noise level. If the user's speech was included in calculating the background noise level, the calculated background noise level may be higher than it should be. As such, the playback volume may adjust higher than what is needed in that instance. The suppressed signals 330 may also be used as a reference for performing echo cancellation, noise cancellation, etc.

Figure 3B:
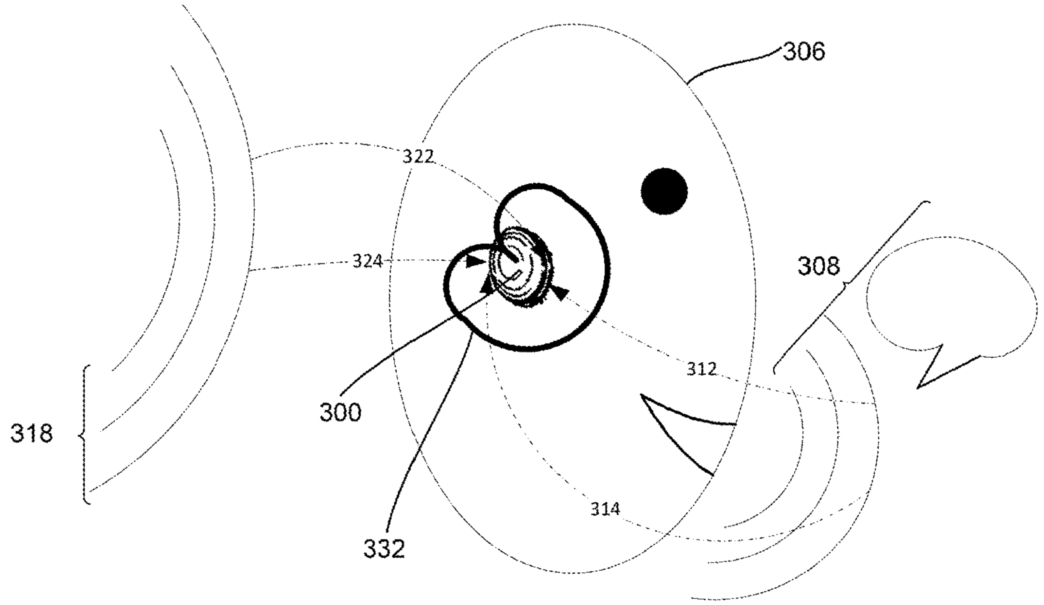

FIG. 3B illustrates an example where the user is talking while using the device and the device has suppressed the background noise. The device 300 may suppress the background noise 318 to provide noise cancellation while the user is talking 308. Additionally or alternatively, the device 300 may suppress the background noise 318 to focus on or amplify the user's speech 308 to ensure that the user's speech 308 is transmitted clearly to a recipient on the other end of the conversation, to ensure that only the user's speech 308 is transmitted, etc.

To suppress the background noise 318, the device 300 may determine the source of the audio is the background noise 318. The device may determine that the audio received is background noise based on a comparison of when the signals were received by the first and second microphone, the loudness of the signals received, etc. For example, background noise 318 may be received 324 by the second microphone before the background noise 318 is received 322 by the first microphone. Additionally or alternatively, the background noise 318 may be received 324 by the second microphone louder than the background noise 318 is received 322 by the first microphone. In these examples, the device 300 may determine that the source of the audio is behind the user 306 and, therefore, is background noise 318. The device 300 may suppress the background noise 318 by processing the signals received 312, 314, 322, 324 by the first and second microphones. The signals received 312, 314, 322, 324 by the first and second microphones may be processed to result in a beam pattern as if the first and second microphones were beamformed when receiving 312, 314, 322, 324 the signals, shown by beam pattern 332.

As shown in FIG. 3B, the signals received 312, 314, 322, 324 by the first and second microphones may have been processed into a cardioid beam pattern 332 pointing towards the user's 306 mouth to focus on the user's speech 308 and remove or suppress background noise.

Figure 3C:
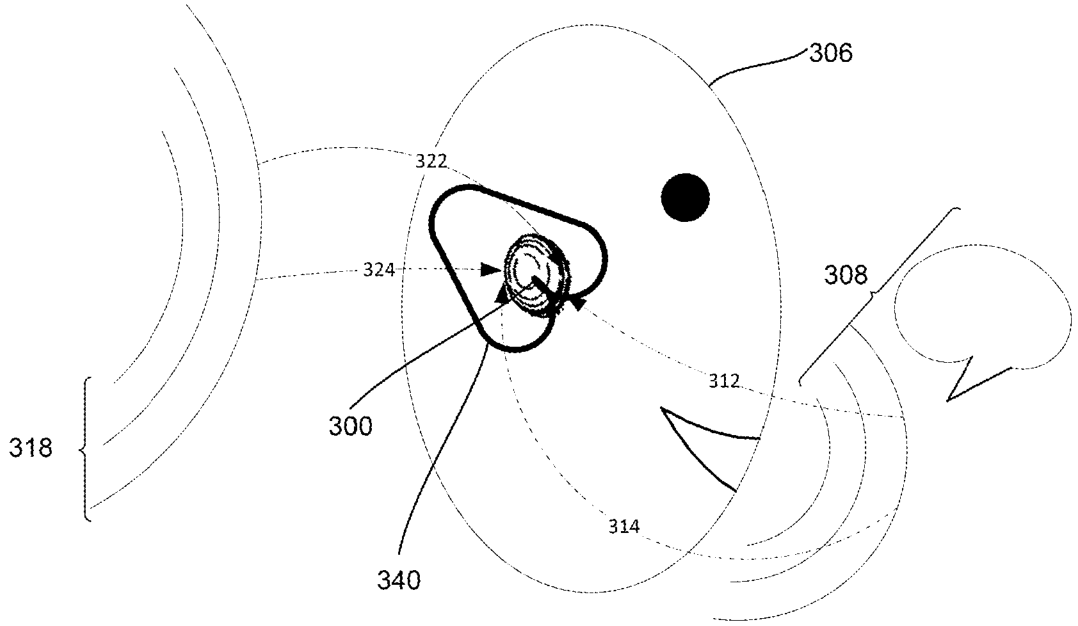

FIG. 3C is similar to FIG. 3A and illustrates an example where the user is talking while using the device and the device has suppressed the user's speech. As shown in FIG. 3C, the signals received by the first and second microphones may have been processed into a hypercardioid beam pattern 340 pointing away from the user's 302 mouth to remove or suppress the user's 302 speech 308. The hypercardioid beam pattern 340 may be similar to the cardioid beam pattern 330 but differs with respect to the width of the pattern. A hypercardioid beam pattern may be more directional than a cardioid beam pattern, meaning the hypercardioid beam pattern is even more focused, or sensitive, in one direction. The hypercardioid beam pattern may also provide more isolation in picking up the background noise based on the direction it is shaped.

Figure 3D:
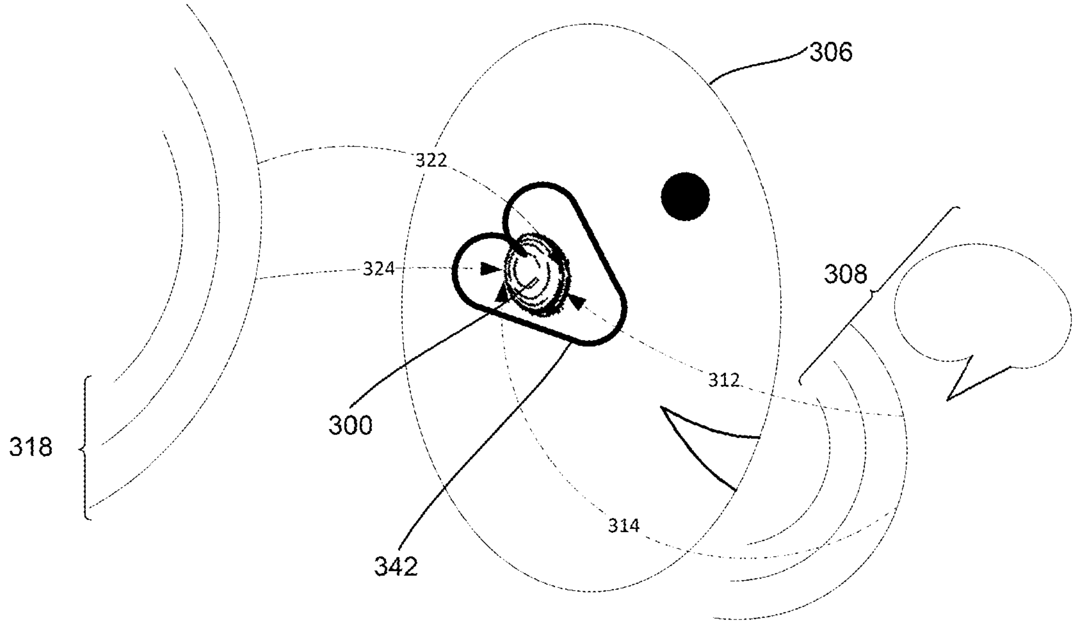

FIG. 3D is similar to FIG. 3B and illustrates an example where the user is talking while using the device and the device has suppressed the background noise. As shown in FIG. 3D, the signals received by the first and second microphones may have been processed into a hypercardioid beam pattern 342 pointing towards the user's 302 mouth to focus on the user's 302 speech 308 and to remove or suppress background noise.

While the above examples include suppressing the user's speech by processing the signal into cardioid beam patterns and hypercardioid beam patterns, the signals may be processed into a variety of other beam patterns and, therefore, the examples above are not meant to be limiting.

Figure 4:
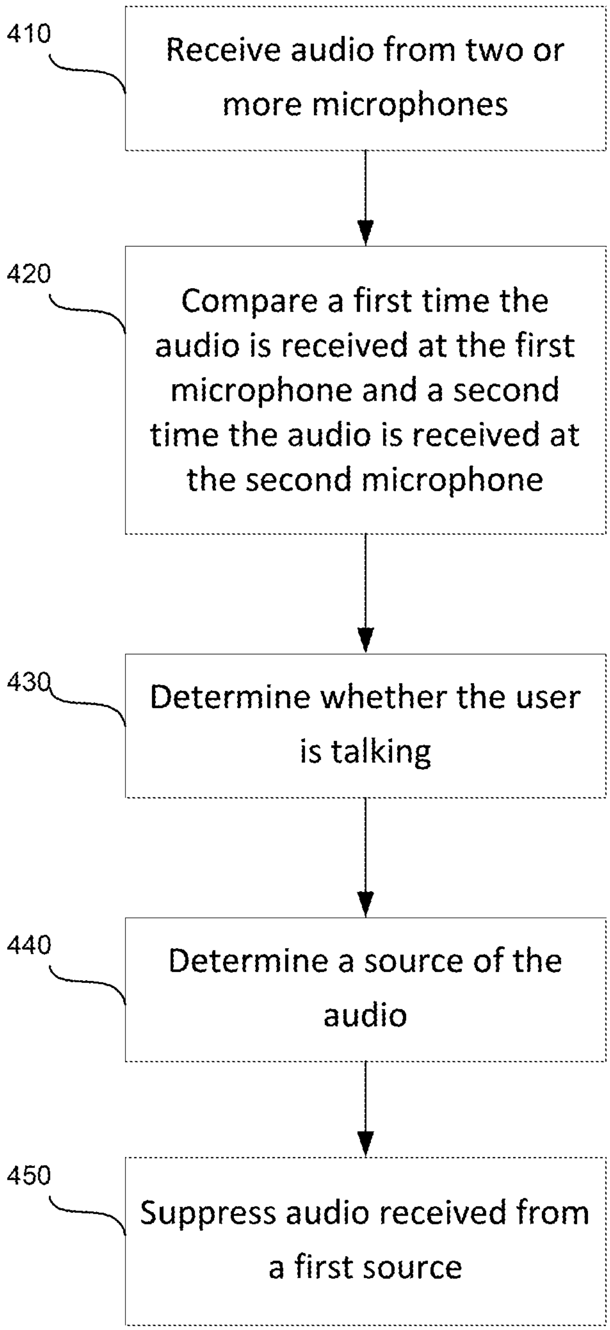
FIG. 4 is a flow diagram illustrating an example method according to aspects of the disclosure.

FIG. 4 illustrates an example method for suppressing audio received from a first source. For example, in block 410 the device may receive audio from two or more microphones. The audio may include a first audio signal received by a first microphone and a second audio signal received by a second microphone. The audio received by the first and second microphones is the same audio, but the signals may be received at different times, may have a different loudness, may have a different frequency, etc.

In block 420, the time that the audio signal is received by the first microphone is compared with the time the audio signal is received by the second microphone. Additionally or alternatively, the loudness of the audio signal received by the first microphone is compared to the loudness of the audio signal received by the second microphone. The frequency of the audio signal received by the first microphone may be compared to the frequency of the audio signal received by the second microphone.

In block 430, the device may determine whether the user is talking. The device may use sensors to determine whether the user is talking. The sensors may include the two or more microphones. Additionally or alternatively, the sensors may include at least one accelerometer that can detect movement consistent with the user talking.

In block 440, the source of the audio is determined. The source may be determined based on a comparison of time, loudness, frequency, etc. of the audio received by the first microphone to the audio received by the second microphone. The source of the audio may be the user, such as when the user is talking. The source of the audio may be background noise.

In block 450, the audio received from a first source is suppressed. The source may be, according to some examples, the user or background noise. For example, if the user is talking, the device may suppress the user's speech such that the user's speech does not contribute to a false estimation of the background noise level. Additionally or alternatively, if the user is talking, the device may suppress the background noise when the user is talking such that the user's speech is the only audio transmitted.

Figure 5:
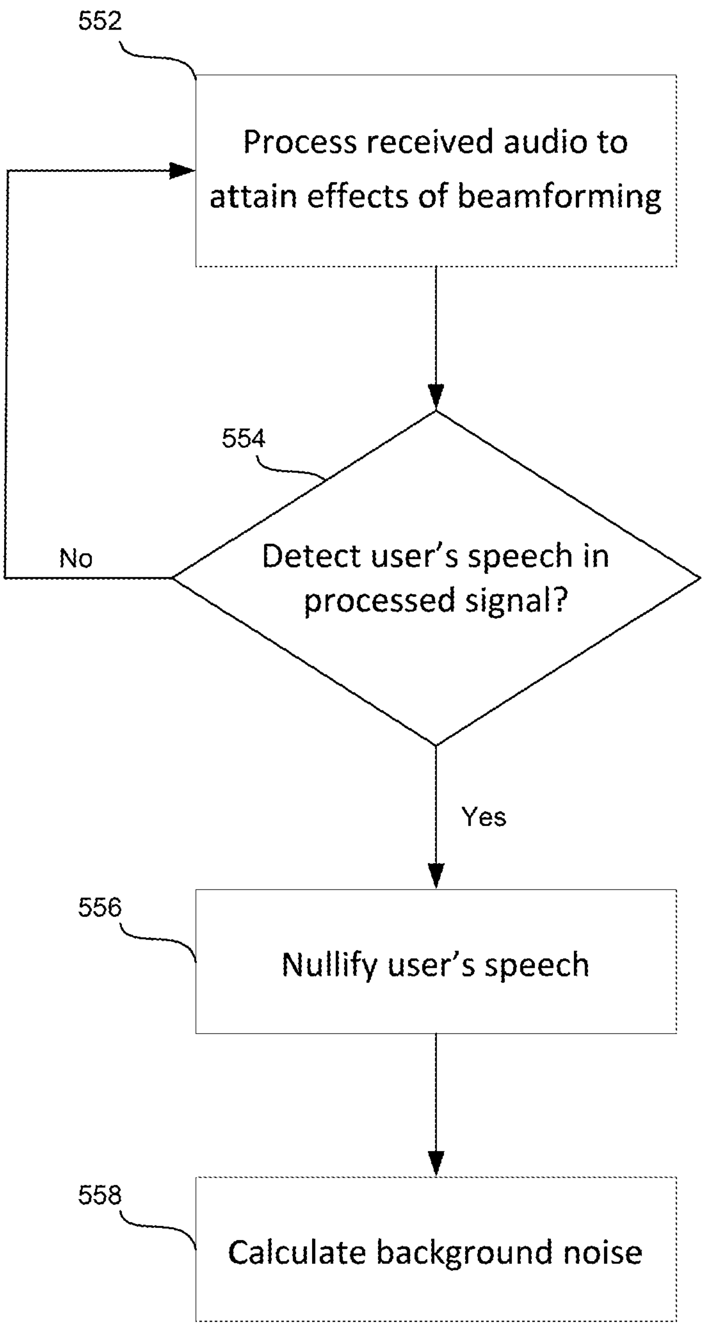
FIG. 5 is a flow diagram illustrating another example method in accordance with aspects of the disclosure.

FIG. 5 illustrates further example operations that may be included in suppressing the audio in block 450 of FIG. 4.

In block 552, the device may perform DSP on the received audio to suppress audio signals from a particular source. In this regard, the processed audio has an effect of being received through a beamformed microphone, though it was received through two omnidirectional microphones. Moreover, because the effect was attained through DSP, various different types of beamformed effects may be created at a same or different times using the same two omnidirectional microphones. For example, to calculate the background noise, speech input from the user may be suppressed by processing the received audio to attain the effect of a beamformed microphone in a direction away from the user's mouth. At a same time or a different time, received audio may be processed for transmission over a network, and as such background noise may be suppressed such that the user's speech can be clearly transmitted. In this regard, the device may suppress background noise signals, giving the effect of having received the audio through a microphone beamformed in a direction towards the user's mouth, such as a cardioid or hypercardioid beam pattern.

In block 554, the device detects whether the user's speech remains in the processed signal. For example, while the user's voice as received through the first microphone closer to the user's mouth may have been suppressed, the user's voice may still have been more faintly picked up by the second microphone further from the user. If the device does not detect that the user's speech in the processed signal, the process returns to block 552.

If the device still detects the user's speech in the processed signal, the process continues to block 556 where the device cancels the user's speech. For example, the user's speech may be used as a reference signal for cancellation.

Accordingly, received audio having characteristics matching the reference signal may be removed using digital signal processing.

In block 558, a background noise level may be calculated using the processed audio. Because the user's speech has been removed, the calculated noise level will not be artificially increased as a result of the user talking while audio for the calculation was being received.

Determining the background noise level by suppressing audio from at least one source provides the user with a greater user experience. As the user is talking, the device may suppress the user's speech in order to determine the background noise level without including the user's speech. Suppressing the user's speech may remove false estimations from the background noise level calculation. A more accurate background noise calculation may provide for better volume adjustments. Further, by suppressing audio from at least one source, the device may be able to provide more reliable echo cancellation and noise cancellation, such as when the background noise is suppressed.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for determining a background noise level, the method comprising:

receiving, by one or more processors, a first audio signal from a first microphone and a second audio signal from a second microphone;

receiving, by the one or more processors, an accelerometer signal from one or more accelerometers, the accelerometer signal comprising at least one frequency;

classifying, by the one or more processors and based on the at least one frequency, a type of activity of the user, the type of activity selected from among a plurality of types of activities, each of the plurality of types of activities corresponding with a frequency range;

comparing, by the one or more processors, the first audio signal and the second audio signal;

determining, by the one or more processors and based on the comparison, whether the source of the received first audio signal is a speech of a user or a background noise;

determining, by the one or more processors and based on the classified type of activity, whether the user is talking; and responsive to a determination that the user is talking, suppressing, by the one or more processors, the first audio signal from the first microphone, the suppressed first audio signal configured to create an effect of receiving the first audio signal through a beamformer microphone that is beamformed in a direction away from or toward a mouth of the user.

2. The method of claim 1, further comprising:

determining, by the one or more processors, a first time that the first audio signal was received from the first microphone;

determining, by the one or more processors, a second time that the second audio signal was received from the second microphone; and determining, using the one or more processors, that the first time occurs before the second time, wherein determining whether the user is talking is further based on the determination that the first time occurs before the second time.

3. The method of claim 1, further comprising, based on the determination that the source of the received first audio signal is the speech of the user:

detecting, by the one or more processors, the speech of the user in the suppressed first audio signal; and nullifying, using the one or more processors, the speech of the user from the suppressed first audio signal.

4. The method of claim 1, wherein the first microphone is located adjacent a first edge of a device and the second microphone is located adjacent a second edge of the device opposite the first edge.

5. The method of claim 1, wherein each of the first and second microphones has an omnidirectional beam pattern.

6. The method of claim 1, further comprising calculating, based on the received first audio signal, the received second audio signal, and the suppressed first audio signal, the background noise level.

7. A device comprising:

one or more accelerometers;

a first microphone;

a second microphone; and one or more processors in communication with the first microphone, the second microphone, and the one or more accelerometers, the one or more processors configured to:

receive a first audio signal from the first microphone and a second audio signal from the second microphone;

receive an accelerometer signal from the one or more accelerometers, the accelerometer signal comprising at least one frequency;

classify, based on the at least one frequency, a type of activity of the user, the type of activity selected from among a plurality of types of activities, each of the plurality of types of activities corresponding with a frequency range;

compare the first audio signal and the second audio signal;

determine, based on the classified type of activity, whether a user is talking;

determine, based on the comparison, whether a source of the first audio signal is a speech of the user; and responsive to a determination that the user is talking, suppress the first audio signal from the first microphone, the suppressed first audio signal configured to create an effect of receiving the audio through a beamformer microphone that is beamformed in a direction away from or toward a mouth of the user.

8. The device of claim 7, wherein the one or more processors are further configured to:

determine a first time that the first audio signal was received from the first microphone;

determine a second time that the second audio signal was received from the second microphone; and determine that the first time occurs before the second time, wherein when determining whether the user is talking is further based on the determination that the first time occurs before the second time.

9. The device of claim 7, wherein the one or more processors are further configured to, based on the determination that the source of the first audio signal is the speech of the user:

detect the speech of the user in the suppressed first audio signal; and nullify the speech of the user from the suppressed first audio signal.

10. The device of claim 7, wherein the first microphone is located at a first end of the device and the second microphone is located at a second end of the device opposite the first end.

11. The device of claim 7, wherein the first and second microphones each have an omnidirectional beam pattern.

12. The device of claim 7, wherein the one or more processors are further configured to calculate, based on the received first audio signal, the received second audio signal, and the suppressed first audio signal, the background noise level.

13. A non-transitory computer-readable medium storing instructions, which when executed by one or more processors, cause the one or more processors to:

receive a first audio signal from a first microphone and a second audio signal from a second microphone;

receive an accelerometer signal from one or more accelerometers, the accelerometer signal comprising at least one frequency;

classify, based on the at least one frequency, a type of activity of the user, the type of activity selected from among a plurality of types of activities, each of the plurality of types of activities corresponding with a frequency range;

compare the first audio signal and the second audio signal;

determine, based on the classified type of activity, whether a user is talking;

determine, based on the comparison, whether a source of the first audio signal is a speech of the user; and responsive to a determination that the user is talking, suppress the first audio signal from the first microphone, the suppressed first audio signal configured to create an effect of receiving the audio through a beamformer microphone that is beamformed in a direction away from or toward a mouth of the user.

14. The non-transitory computer-readable medium of claim 13, wherein the instructions further cause the one or more processors to:

determine, when a user is talking, a speech of the user;

detect the speech of the user in the suppressed first audio signal; and nullify the speech of the user from the suppressed first audio signal.

15. The method of claim 1, wherein configuring the suppressed first audio signal to create the effect of receiving the audio through a beamformer microphone that is beamformed in a direction away from or toward a mouth of the user comprises generating, using the one or more processors, a cardioid beam pattern based on the first audio signal.

16. The method of claim 1, wherein configuring the suppressed first audio signal to create the effect of receiving the audio through a beamformer microphone that is beamformed in a direction away from or toward a mouth of the user comprises generating, using the one or more processors, a hypercardioid beam pattern based on the first audio signal.

17. The non-transitory computer-readable medium of claim 13, wherein the instructions further cause one or more processors to:

determine a first time that the first audio signal was received from the first microphone;

determine a second time that the second audio signal was received from the second microphone; and determine that the first time occurs before the second time, wherein when determining whether the user is talking is further based on the determination that the first time occurs before the second time.

18. The non-transitory computer-readable medium of claim 13, wherein the first and second microphones each have an omnidirectional beam pattern.

19. The non-transitory computer-readable medium of claim 13, wherein the instructions further cause one or more processors to calculate, based on the received first audio signal, the received second audio signal, and the suppressed first audio signal, the background noise level.

20. The method of claim 1, wherein the plurality of types of activities includes talking, walking, typing, and driving.

21. The method of claim 1, wherein the accelerometer signal is a first accelerometer signal received at a first time, the method further comprising:

receiving, by the one or more processors, a second accelerometer signal from the one or more accelerometers at a second time, the second time being before the first time and the second accelerometer signal comprising at least one frequency;

classifying, by the one or more processors and based on the at least one frequency of the second accelerometer signal, a second type of activity of the user, the second type of activity selected from among the plurality of types of activities;

determining, by the one or more processors and based on the classified second type of activity, that the user is not talking; and responsive to the determination that the user is not talking, monitoring, by the one or more processors, for additional accelerometer signals.

* * * * *